United States Patent Office 3,025,099
Patented Mar. 13, 1962

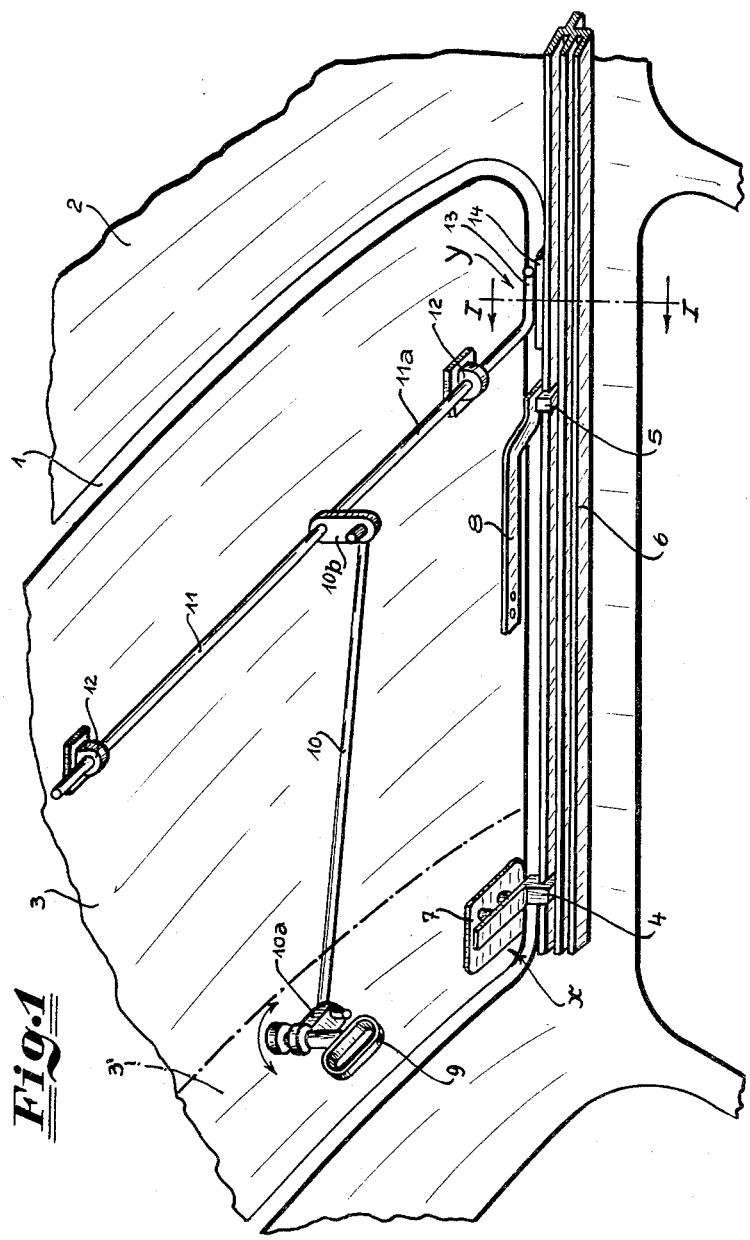

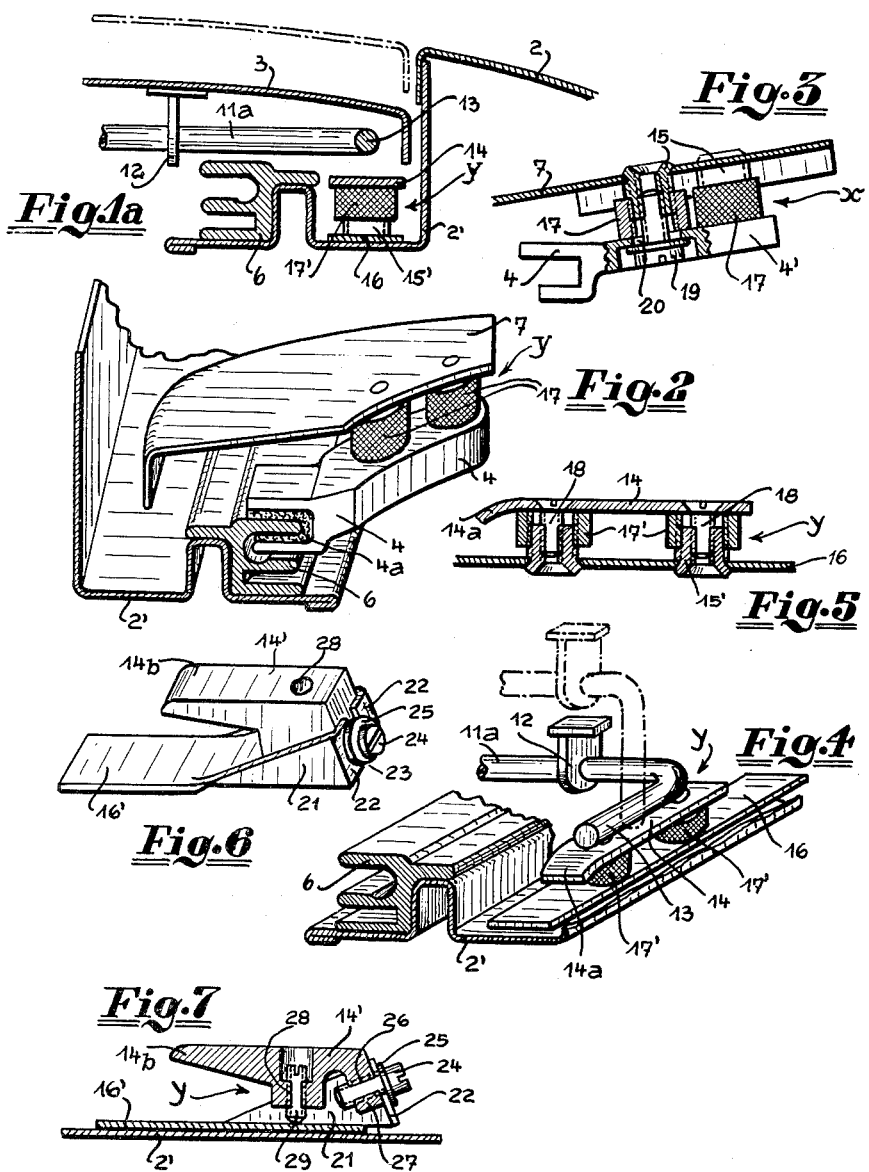

3,025,099
SLIDING ROOF ARRANGEMENTS FOR
MOTOR VEHICLES
Johannes Werner, Offenbach (Main), Germany, assignor
to H. T. Golde G.m.b.H. & Co. K.G., Frankfurt am
Main, Germany
Filed Feb. 10, 1959, Ser. No. 792,360
Claims priority, application Germany Feb. 12, 1958
10 Claims. (Cl. 296—137)

This invention relates to a sliding roof arrangement for a motor vehicle, wherein a part of the roof is displaceable in the longitudinal direction of the vehicle and which part may be a rigid sliding cover or a foldable roof part.

Such displaceable roof parts are usually guided for displacement in the longitudinal direction of the vehicle by means of guide elements mounted on the front portion of the roof part, said elements being slidable on slide rails mounted on a frame of the fixed part of the vehicle roof. Rigid sliding roofs having a rigid sliding cover longitudinally displaceable in such slide rails, they also generally have rear guide elements which are mounted on the rear end of the sliding cover and also on the rear fixed part of the roof, there being also special control devices which enable the rear guide elements to be supported on bearing plates of bearing ramps in such a manner that the rear end of the sliding cover, when in its closed position, is disposed approximately flush with the fixed roof part.

An object of the invention is to provide supporting devices by which the forward guide elements are connected to the displaceable roof part, the supporting devices being adjustable so that the space between the displaceable roof part and the guide elements can be accurately varied by the supporting devices in relation to the fixed roof part at the time of assembly.

A further object of the invention is to provide rear supporting devices for a rigid sliding cover whereby the spacing between the rear end of the sliding cover and the bearing plates and the bearing ramps can be adjusted continuously by the supporting devices at the time of assembly such that the said end will be exactly flush with the fixed roof part when in the closed position.

The invention avoids the necessity, at the time of assembly of the sliding roof, of laboriously and slowly taking apart the front and/or rear supporting devices and inserting or removing spacer plates of various thicknesses below the displaceable roof part. The spacer plates serve the purpose of varying the height or level of the displaceable roof part so that when the sliding roof is in its closed position it will be exactly flush with the fixed part of the vehicle roof at the front and at the rear thereof.

The invention also makes it possible to utilize uniform and homogeneous sliding portions for different types of motor vehicles each having a different roof curvature, and also to compensate for inaccuracies in manufacture.

Further features and advantages of the invention will become apparent from the following description with reference to the accompanying drawings, wherein:

FIGURE 1 is a simplified perspective view from below of a sliding roof with a rigid cover according to the invention, the lining being omitted and the position of the rear edge of a forward strut for a folding roof, being shown in chain-dotted lines, FIGURE 1a is a simplified sectional view through a detail taken on the line I—I of FIGURE 1, FIGURE 2 is a perspective view of a forward guide element in conjunction with the associated slide rail according to FIGURE 1, FIGURE 3 is an end view, partly in section, of the forward guide element according to FIGURE 2 in conjunction with the associated supporting device at the front end of the sliding cover according to FIGURE 1, FIGURE 4 is a simplified perspective view of a supporting device according to the invention for the rear end of a sliding cover according to FIGURE 1, FIGURE 5 is a longitudinal sectional view through the supporting device according to FIGURE 4, FIGURE 6 is a simplified perspective view of a further embodiment of a supporting device according to the invention for the rear end of a sliding cover according to FIGURE 1, and FIGURE 7 is a longitudinal sectional view through the supporting device according to FIGURE 6.

Referring to FIGURES 1 and 1a, there is shown diagrammatically at 2 a portion of the fixed roof of a vehicle body, the fixed roof being formed with an aperture 1 adapted to be closed by a sliding roof part which is in the form of a rigid sliding cover 3. The cover is shown situated in said aperture in a pushed-forward but lowered position, in which the rear end of the sliding cover is disposed lower than the fixed vehicle roof so that said sliding cover can be slid rearwardly under the rear end of the fixed part 2 of the vehicle roof. FIGURE 1a shows in chain-dotted lines the raised position of the sliding cover 3, wherein all the edges of the cover are located flush with the fixed part 2 of the vehicle roof. In this raised position, a part 13 connected to the sliding cover 3 bears on a bearing ramp 14, as will be described in greater detail hereinafter.

Situated at each side near the front end of the sliding cover is a supporting device x. Each supporting device is associated with a guide element 4, each guide element engaging one of two slide rails 6 which are arranged one at each side edge of the roof aperture 1. The slide rails 6 are parallel to the side edges of the aperture 1 and are rigidly connected to a roof frame 2' (FIGURE 2) which constitutes a portion of the fixed part 2 of the vehicle roof bounding the roof aperture. Each of the supporting devices x supports at the upper side a bearing plate 7 which is connected to the forward end of the sliding cover, preferably by welding. In this way, the forward end of the sliding cover is guided for displacement along the rails 6.

Arranged near the rear end of the sliding cover 3 is a further pair of guide elements 5, which are connected to the cover 3 by connecting members such as flat springs 8, the latter each being fixed to one guide element 5 and to the cover. The flat springs 8 tend to pull the rear end of the sliding cover downwardly i.e. in the directions towards the rails 6.

When the aperture 1 is to be closed, cover 3 is pushed forward into the position shown in FIGURES 1 and 1a, and is brought into a position flush with the roof by handle 9 which in known manner locks the cover to the fixed roof part in its final position through a locking device not shown in the drawings. The handle 9 is coupled to a rod 10 and lever elements 10a and 10b so as to rotate rotatable rods 11, 11a in bearings 12 rigidly connected to the cover 3. Portions 13 extend perpendicularly from rods 11 and 11a. By rotating the handle, each of the parts 13 of the rotatable rods 11, 11a is pivoted downwardly out of the position illustrated in FIGURE 1, to bear on the associated bearing ramp 14. Each of these bearing ramps 14 forms an upper part of a rear supporting device y. FIGURE 4 shows in broken lines how the cover is raised into its closed position wherein it is flush with the fixed part 2 of the vehicle roof. Each of the rear supporting devices y is supported on a bearing plate 16 rigidly connected to the roof frame 2'.

FIGURE 1a illustrates the rear supporting device y and its arrangement on the frame 2' of the fixed part 2 of the vehicle roof and will be further described hereinafter.

According to the invention, the forward supporting devices x and, if desired, the rear supporting devices y are made vertically adjustable to compensate for manufacturing inaccuracies when the parts are fitted on a motor vehicle. It will be apparent that, in the case of the rear supporting device y, either the ramp 14 itself can be made vertically adjustable or each of the parts 13 connected to the cover can be made adjustable in length in a manner not shown in the drawings, e.g. by making these parts 13 capable of being extended telescopically and fixed in an extended position. In the latter case, the parts 13 can bear directly on the associated bearing plate 16, and the parts of the supporting device situated between the parts 14 and 16 can be omitted.

FIGURES 2 and 3 show details of the forward supporting devices indicated generally at x. Each guide element 4, which is constructed as a guide shoe and is provided with a felt lining or the like 4a, comprises an arm 4′ in which are formed two slots 20 arranged side by side and adapted to receive two headed screws 19, the slots extending transversely to the direction of displacement of the cover 3 and the threaded portions of the screws extending upwardly through the slots. The screw-threads of the screws 19 engage with corresponding internal screw-threads formed in two sleeves 15 which are rigidly connected to the associated bearing plate 7 such as by riveting. Formed on each of the sleeves 15 is an external screw-thread which engages the corresponding internal screw-thread of milled nuts 17 each of which rest on the associated guide element 4.

In order to vary the spacing between the parts 4 and 4′ and the bearing plate 7 and thus the spacing between the cover 3 and the roof frame 2′, the screws 19 are loosened and the milled nuts 17 are turned in the direction corresponding to the desired adjustment to engage fewer or greater threads on the sleeves 15. In this case the milled nuts bear against the part 4′ under the load of the cover 3. When the sliding cover 3 has been set to the correct height, at which it is exactly flush with the fixed part of the vehicle roof, the screws 19 are tightened and thus any undesirable accidental rotation of the milled nuts 17 is prevented. The slots 20 permit displacement of the guide elements 4 transversely to the direction of movement of the sliding roof and thus permit compensation of any differences in width which may exist, as a result of manufacturing inaccuracies, at the small edge gap left between the sliding cover and the fixed vehicle roof.

FIGURES 4 and 5 show details of the rear supporting devices, indicated generally at y, and the arrangement thereof on the roof frame 2′. Each rear supporting device comprises the aforesaid bearing part 13 connected to the sliding cover, and also a bearing ramp 14. This ramp is curved downwards slightly at 14a, in order to insure engagement of part 13 on the ramp. In the preferred form of embodiment of the invention, the ramp is vertically adjustable relative to bearing plate 16, which is rigidly connected to the roof frame 2′. This adjustment enables the rear end of the cover 3 to be positioned exactly flush with the fixed part 2 of the vehicle roof in the closed position.

Rigidly connected to each of the bearing plates 16 are two sleeves 15′. These sleeves 15′ are provided with internal and external screw-threads. A milled nut 17′ is screwed onto the external screw-thread of the sleeve. The bearing ramp 14 is supported in the upper face of milled nut 17′. Engaging in the internal screw-thread of these sleeves 15′ is the screw-thread of the screw 18 which projects downwardly through a hole in the ramp 14. Vertical adjustment is effected by releasing the screws 18 and turning the milled nuts 17′ until the ramp 14 is positioned as desired. This latter position is fixed by tightening the screws 18. The heads of these screws 18 are expediently countersunk in the ramp 14.

FIGURES 6 and 7 show a further example of an embodiment of the continuously vertically adjustable supporting device at the rear end of the cover. A bearing plate 16′, which is rigidly connected to the roof frame 2′, comprises two upwardly projecting lugs 21 each having an element 22 extending therefrom, the latter elements extending inwardly towards one another to define a slot 23 therebetween. This slot guides a clamping screw 24 which bears through a washer 25 on the lugs 22 and engages in a tapped hole 26 in an extension 27 of a bearing ramp 14′. This ramp 14′ also includes a sleeve portion in and comprises a vertical tapped hole 28 in which is inserted a grub screw 29. The sleeve portion of ramp 14′ is integral therewith, and, therefore is fixed thereto in a manner similar to sleeves 15 and 15′ and bearing plate 7 and bearing ramp 14, respectively. The lower end of this grub screw 29 bears on a bearing plate 16′ which corresponds to the bearing plate 16 of FIGURE 4 and is rigidly connected to the roof frame 2′. The ramp 14′ is somewhat curved in the downward direction at 14b.

In the latter embodiment, vertical adjustment is effected in the following manner. The clamping screw 24 is loosened, and the grub screw 29 is turned in the tapped hole 28 until the bearing surface of the bearing ramp 14′ is at the correct height. Then the screw 24 is tightened and thus any accidental vertical displacement is prevented.

The invention has been described hereinbefore with reference to a rigid sliding roof cover. However, it will be apparent that the invention can also be applied to a so-called folding roof. In this case, the forward strut 3′ of the sliding roof, whose rear edge is indicated in broken lines in FIGURE 1, is merely guided on the slide rails 6 by means of guide elements corresponding to the parts 4, and supported adjustably by means of the supporting devices x. The rear guide elements 5 and the rear supporting devices y or 13 are omitted in the case of a folding roof, since its cloth covering is fixedly connected at its rear end to the rear fixed part of the vehicle roof 2.

It will also be apparent that the invention is not limited to the examples of embodiment of the supporting devices x and y which have been described hereinbefore. Thus, as already mentioned, to provide adjustability at the rear supporting device the length of the part 13 can be made variable so that in the closed position illustrated in chain-dotted lines in FIGURE 4 the sliding cover is exactly flush with the vehicle roof. This can also be effected, for example, by providing part 13 of each rotatable rod 11, 11a with a screw-thread on to which an internally threaded sleeve is screwed and secured by means of a lock nut. By turning this threaded sleeve, the length of the part 13 and therefore the height of the sliding cover in the closed position can be varied. Moreover, in the latter case the ramp-like part 14 or 14′ of the supporting device y can be connected rigidly to the bearing plate 16 or 16′.

I claim:

1. A sliding roof arrangement for a motor vehicle body having a roof formed with an aperture therein, said arrangement comprising a roof frame which is rigidly connected to the vehicle body and which bounds the roof aperture, said frame providing side edges extending in the longitudinal direction of the vehicle body, a movable roof part for covering the roof aperture and displaceable in the longitudinal direction of the vehicle body on said roof frame for the purpose of opening the roof aperture, guide members connected to the side edges of the roof frame for guiding the movable roof part during the opening and closing movements thereof, guide elements dispose at the forward end of and connected to said movable roof part, which guide elements co-operate with said guide members when the movable roof part is displaced longitudinally, supporting devices for the forward end of the movable roof part, said supporting devices being arranged between said movable roof part and the forward guide elements, adjustable means on said supporting devices for varying the supporting height thereof and thus the spacing of the longitudinally movable roof part from said forward guide elements, each of said adjustable supporting devices comprising a bearing member rigidly connected to the movable roof part, an internally and externally screw-threaded sleeve rigidly connected to said bearing part, a holding screw rotatably mounted in said guide element and engaging the internal screw-thread of said sleeve, and a milled nut which bears on said guide element and which is screwed onto the external screw thread of the sleeve for adjustment axially of said sleeve when the holding screw is loosened, in order to vary the aforesaid spacing, whereafter the holding screw can be tightened to secure the supporting device in adjusted position.

2. A sliding roof arrangement according to claim 1, wherein each holding screw is mounted displaceably in an elongated slot formed in the associated guide element and extending transversely to the direction of displacement of the movable roof part.

3. A sliding roof arrangement for a motor vehicle body having a roof formed with an aperture therein, said arrangement comprising a roof frame which is rigidly connected to the vehicle body and which bounds the roof aperture, said frame providing side edges extending in the longitudinal direction of the vehicle body, a movable roof part for covering the roof aperture and displaceable in the longitudinal direction of the vehicle body on said roof frame for the purpose of opening the roof aperture, guide members connected to the side edges of the roof frame for guiding said movable roof part during the opening and closing movements thereof, guide elements disposed at the forward end of and connected to said sliding cover, which guide elements co-operate with the guide members when said movable roof part is displaced longitudinally, supporting devices for the forward end of said movable roof part, said supporting devices being arranged between said movable roof part and the forward guide elements and adjustment means on said supporting devices for varying the supporting height thereof and thus the spacing of the longitudinally movable roof part from the forward guide elements, two bearing members arranged one above the other at each of said supporting devices, one of said bearing members being rigidly connected with said movable roof part, said other bearing member being rigidly connected with said forward guide elements, height adjustable spacing means positioned between said bearing members, said spacing means including an element rigidly mounted at said one bearing member and having a threaded portion, a rotatably arranged adjusting member having a threaded part complementary to said threaded portion for rotational engagement therewith and rotatable in a first direction to effect an increase in the height of said spacing means and in a direction opposite to said first direction to cause a decrease in the height of said spacing means and releasable supporting means for the rigid connection of said two bearing members arranged one above the other to secure and maintain the space adjusted by said spacing means.

4. Sliding roof apparatus for a motor vehicle body having a roof formed with an aperture therein, said apparatus comprising a roof frame on the vehicle body bounding the roof aperture, said frame providing side edges extending in the longitudinal direction of the vehicle body, a movable roof part for covering the roof aperture and displaceable in the longitudinal direction of the vehicle body on said roof frame, guide members connected to the side edges of the roof frame for guiding the movable roof part, guide elements on the forward end of said movable roof part, said guide elements cooperating with said guide members when the movable roof part is displaced longitudinally, supporting devices for the forward end of the movable roof part, said supporting devices being between said movable roof part and the forward guide elements, said movable roof part and the forward guide elements defining a space therebetween, adjustable means on said supporting devices for varying the height of said supporting devices whereby said space is varied, each of said adjustable supporting devices comprising a bearing member on the movable roof part, an internally and externally screw-threaded sleeve rigidly connected to said bearing member, a holding screw rotatably mounted in said guide element and engageable with the internal screw-thread of said sleeve, and a milled nut bearing on said guide element and threadably engageable with the external screw thread of the sleeve for axial adjustment of said sleeve with the holding screw loosened, to vary said space to an adjusted position, the holding screw adapted to be tightened to secure the supporting device in said adjusted position, the apparatus further comprising bearing devices including two members, one being above the other and adapted for supporting each side of the rear end of the longitudinally movable roof part, each of said bearing devices being connected to a side edge of the roof frame, rear supporting means on the rear end of the longitudinally movable roof part, said rear supporting means being on said movable roof part and adapted for movement between said movable roof part and the bearing devices, said bearing devices including adjustment means for vertical adjustment of said bearing devices with respect to said side edges of the roof frame.

5. Sliding roof apparatus as claimed in claim 4, wherein said adjustment means for the rear end of the movable roof part comprises an internally and externally screw-threaded sleeve rigidly connected to one of said members of the bearing devices, a milled nut screwed onto the external screw thread of said sleeve for adjustment axially of said sleeve and a holding screw rotatably mounted in the other of said bearing members and engaging the internal thread of said sleeve to secure said bearing devices in adjusted position.

6. Sliding roof apparatus as claimed in claim 4 wherein each holding screw is mounted displaceably in an elongated slot formed in the associated guide element and extends transversely to the direction of displacement of the movable roof part.

7. Sliding roof apparatus as claimed in claim 4, wherein each of the bearing devices comprises a bearing plate member connected to the side edge of said roof frame, a bearing ramp member adapted for supporting the rear supporting means, a sleeve rigidly connected to the bearing plate member, said sleeve being screw-threaded externally and internally, a holding screw engageable in the internal screw-thread of said sleeve and rotatably supported by said bearing ramp member, and a milled nut bearing on said bearing ramp member and threadably engageable with the external screw-thread of the sleeve for axial adjustment of said sleeve, with said holding screw loosened, to vary the space between the bearing ramp member and the bearing plate member to an adjusted position, said holding screw adapted to be tightened to secure the bearing devices in said adjusted position.

8. Sliding roof apparatus as claimed in claim 7, wherein the rear supporting means comprises a rod rotatably supported by the movable roof part, said rod having end portions substantially perpendicular to the longitudinal extent of the rod, said end portions, with said rod rotated, being directed downwardly and adapted for engagement with said bearing device to displace the rear end of the movable roof part to a position coextensive with said roof frame.

9. Sliding roof apparatus as claimed in claim 4, wherein each of the bearing devices comprises a bearing plate member connected to the side edges of the roof frame, a bearing ramp member adapted for supporting the rear supporting means, said bearing ramp member being provided with a tapped hole, a screw in said tapped hole engageable with the bearing plate member, said bearing ramp member being axially displaceable by rotation of said screw in said tapped hole with said screw engageable with the bearing plate member to provide adjustment of the distance between the bearing ramp member and the bearing plate member, and means for guiding said bearing plate member and said bearing ramp member during relative displacement thereof.

10. Sliding roof apparatus as claimed in claim 9, wherein said means for guiding the bearing plate member and the bearing ramp member comprises clamping means operatively associated with said latter members, one of said latter members including an extension provided with a slot in the direction of relative displacement of said latter members, said clamping means in a first position being displaceable through said slot and in a second position clamping said latter members together to prevent relative movements therebetween.

References Cited in the file of this patent

UNITED STATES PATENTS

| | | |
|---|---|---|
| 988,814 | Reid | Apr. 4, 1911 |
| 2,193,607 | Votypka | Mar. 12, 1940 |
| 2,338,309 | Votypka | Jan. 4, 1944 |
| 2,550,323 | Bishop | Apr. 24, 1951 |

FOREIGN PATENTS

| | | |
|---|---|---|
| 656,021 | France | Apr. 26, 1929 |
| 772,259 | Great Britain | Apr. 10, 1957 |